Patented June 26, 1928.

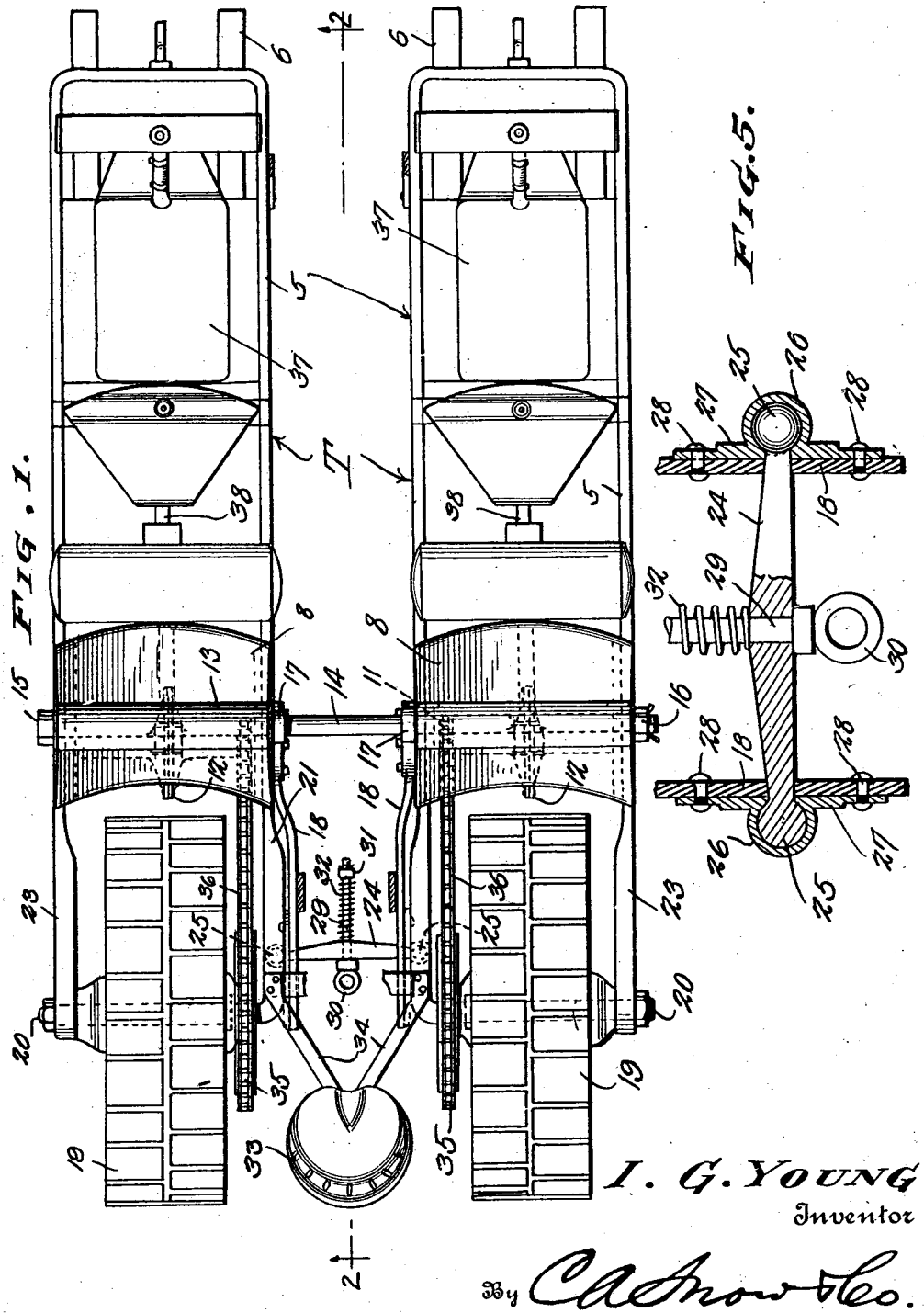

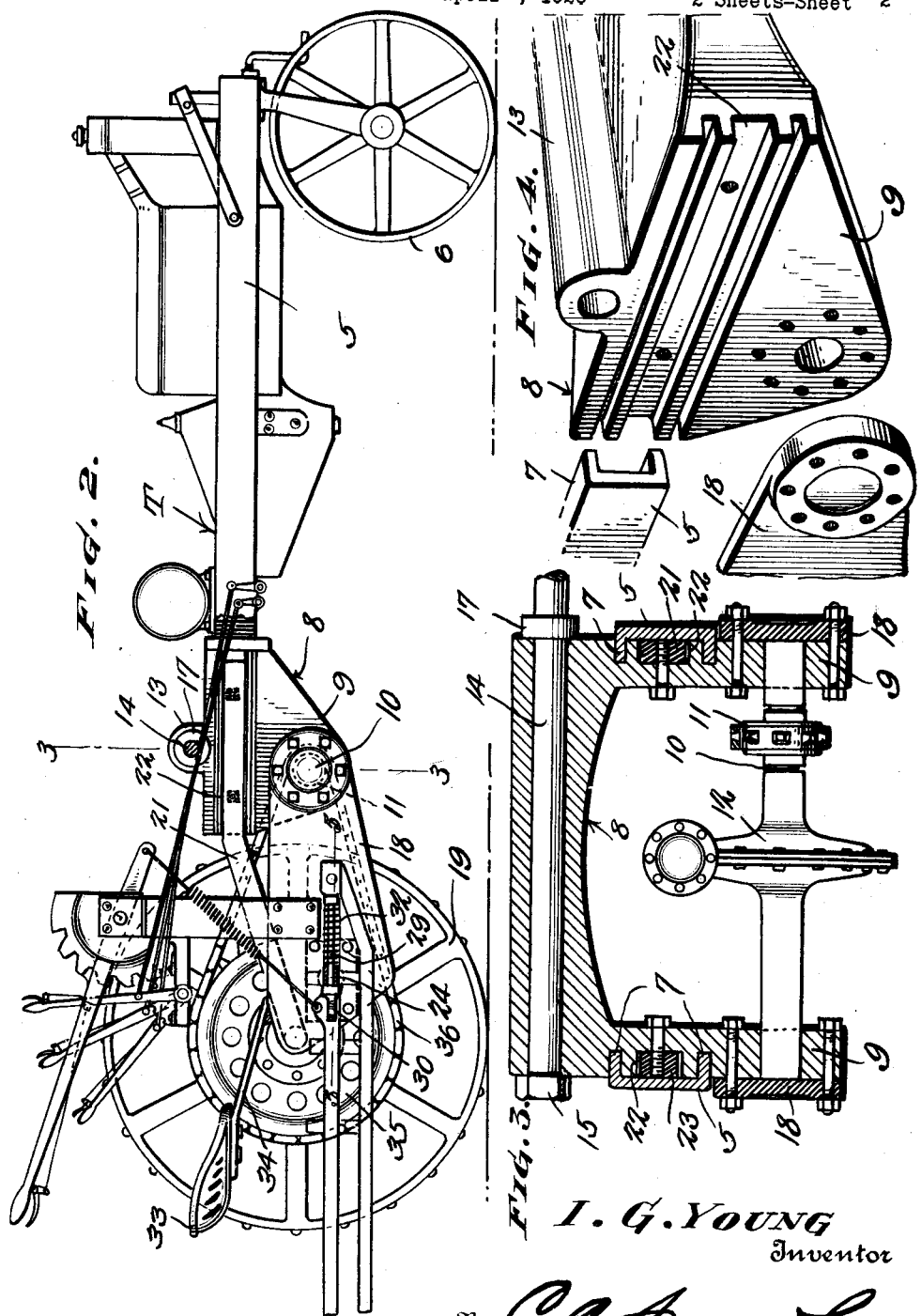

1,675,013

UNITED STATES PATENT OFFICE.

IDUS G. YOUNG, OF BRISTOW, OKLAHOMA.

TRACTOR CONSTRUCTION.

Application filed April 7, 1926. Serial No. 100,345.

This invention relates to tractors and aims to provide novel means whereby two or more tractors may be connected together to provide a power device for drawing farm machinery such as cultivators, plows or the like.

Another important object of the invention is to provide means to increase the power of a single tractor to adapt the power devised for various usages.

Another object of the invention is to provide means for accomplishing the steering of the tractor by the application of power or the reduction of power on either of the wheels of the tractors, which are coupled.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view illustrating tractors coupled by means of a coupling device constructed in accordance with the invention.

Figure 2 is a sectional view taken on line 2—2 of Figure 1.

Figure 3 is a sectional view taken on line 3—3 of Figure 2.

Figure 4 is a perspective view illustrating one end of one of the coupling devices, and Figure 5 is a sectional view taken on approximately line 5—5 of Figure 2.

Referring to the drawing in detail, the reference character T indicates tractors, which are coupled in parallel relation with each other, by means of the coupling device forming the essence of the present invention.

Each tractor embodies side rails 5, and the usual front wheels 6 for supporting the forward portion thereof. As illustrated by Fig. 1, the side rails 5 of each tractor are arranged in parallel relation with each other and constitute angle bars, the flanges 7 thereof being designed to fit within the grooves formed in the sides of the coupling members 8 so that the coupling members will be securely held in position.

These members 8 have depending end portions 9 that are provided with openings to accommodate the outer ends of the drive shaft 10 of the tractor of which the member 8 forms a part, the drive shaft being indicated by the reference character 10 and shown as extending from one of the members 9 to the opposite member 9. The sprocket indicated at 11 is mounted on this drive shaft and receives motion from the driving gears contained in the housing 12 associated therewith.

It will of course be understood that the usual tractor wheels are removed from the axle 10 and the sprocket 11 and member 8 positioned thereon in lieu of the wheels.

Formed integral with each member 8 and disposed transversely thereof, is an elongated enlargement 13 provided with an opening for the reception of the connecting rod 14 that is supplied with a head 15 on one of its ends and a threaded end to receive the nut 16 at its opposite end, there being provided nuts 17 on the rod 14 to engage the members 8 to rigidly secure the rod 14 to the members 8.

From the foregoing it will be obvious that due to this construction, two or more tractors may be rigidly connected and held in predetermined parallel spaced relation with each other, thereby coupling the power of a plurality of tractors and adapting the device for unusually heavy work.

Bolted to the depending portions 9 of the coupling members 8, are rearwardly extended plates 18 that act as chain guards to protect the operator against damage by the chains while in operation.

The power wheels are indicated at 19 and are supported on the shafts 20 that are formed integral with the arms 21 that have their forward extremities positioned within the grooves 22 formed exteriorly of the members 8 as clearly shown by Figure 3 of the drawings.

Arms 23 are connected to the opposite sides of the members 8 and extend rearwardly where they are provided with openings to receive the outer ends of the shafts 20.

The draft bar forming a part of the invention includes a transverse bar 24 formed with heads 25 at its ends, which heads are positioned within the socket members 26 that are provided with flanges 27 which in turn are formed with openings to receive the rivets 28 for securing the socket members in position on the tractor frame.

This bar 24 has connection with the adjacent rearwardly extended plates 18 of the tractors, and is formed with a central opening to accommodate the rod 29 formed with an eye 30 at its read end, the forward end thereof being supplied with a nut 31 acting as a seat for one end of the coiled spring 32.

The opposite end of the spring 32 contacts with the bar 24 as shown by Figure 5 so that the agricultural machine which may be connected to the draw bar through the medium of a suitable chain, cable or the like, which may be passed through the eye 30 will direct the initial strain to the spring 32 relieving the rigid elements of the draft bar of undue strain.

The seat is indicated at 33 and is supported by arms 34 that have their forward ends connected to the arms 21. Power is transmitted from the sprockets 11 to the substantially large sprockets 35 through the medium of the chains 36, and it will be obvious that the wheels 19 will operate independently of each other through the engine 37 and drive shaft 38 associated therewith, with the result that should it be desired to turn the coupled tractors to the right, the wheel 19 at the right of the device will be thrown out of operation by means of the usual clutch mechanism not shown, whereupon the opposite wheel 19 which continues to operate will push the machine to the right, to the end that the steering may be accomplished by the application of power to certain drive wheels 19.

From the foregoing it will be seen that two substantially small tractors may be connected to increase the power of the tractor and combine the powers of two tractors for heavy duty work.

It will of course be understood that the usual front wheels and connecting elements of a tractor must be replaced by freely castering wheels which require no direct control, the steering being accomplished by the manipulation of the clutches to change the speeds of the tractor drive wheels.

I claim:

1. A coupling device for coupling tractors in parallel relation with each other, said coupling device including members adapted to be positioned between the side rails of the tractors to be coupled, a transversely disposed elongated enlargement formed on the upper surface of each member, said enlargements having openings, and a connecting rod extended through the openings to secure the tractors together.

2. A coupling device for coupling tractors, including members adapted to be secured between the side rails of tractors, each of said members having a transversely disposed enlargement formed on its upper surface, the enlargements of the members having openings, a connecting rod having its ends disposed within the openings and secured thereto to hold the tractors in spaced relation with each other, and said members having grooves to accommodate the side members of the tractors.

3. A coupling device for coupling tractors comprising members adapted to be secured between the side rails of tractors wherein the side rails have inwardly disposed flanges, said members having grooves to accommodate the inwardly disposed flanges, a connecting rod having connection with the members for holding the members in spaced relation with each other, and means on the ends of the rod for securing the rod to the members.

4. In a device of the character described, rearwardly extended arms, one of said arms having an inwardly extended portion providing a supporting shaft, the forward ends of the arms having connection with the rear ends of the side rails of the chassis of a tractor, and means for securing the arms to the side rails to prevent movement of the arms with respect to the side rails.

In testimony that I claim the foregoing as my own, I have hereto affixed my signature.

IDUS G. YOUNG.